United States Patent
Veereshwara et al.

(10) Patent No.: US 10,289,398 B2
(45) Date of Patent: May 14, 2019

(54) IN-SERVICE UPGRADE OF KERNEL LOADABLE MODULES

(71) Applicant: CISCO TECHNOLOGY, INC., San Jose, CA (US)

(72) Inventors: Srinivas Veereshwara, San Ramon, CA (US); Senthilkumar Pandian, Fremont, CA (US); Akshya Kumar Singh, Fremont, CA (US); Ravinandan Arakali, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 278 days.

(21) Appl. No.: 14/866,952

(22) Filed: Sep. 26, 2015

(65) Prior Publication Data

US 2017/0090897 A1    Mar. 30, 2017

(51) Int. Cl.
| | | |
|---|---|---|
| *G06F 9/44* | (2018.01) | |
| *G06F 9/45* | (2006.01) | |
| *G06F 8/65* | (2018.01) | |
| *H04L 29/08* | (2006.01) | |
| *G06F 8/656* | (2018.01) | |
| *G06F 8/71* | (2018.01) | |
| *G06F 8/61* | (2018.01) | |

(52) U.S. Cl.
CPC ............... *G06F 8/65* (2013.01); *G06F 8/656* (2018.02); *H04L 67/34* (2013.01); *G06F 8/61* (2013.01); *G06F 8/71* (2013.01)

(58) Field of Classification Search
CPC ..... G06F 8/61; G06F 8/65; G06F 8/67; G06F 8/68; G06F 8/71
See application file for complete search history.

(56) References Cited

U.S. PATENT DOCUMENTS

| | | | |
|---|---|---|---|
| 7,415,710 B1* | 8/2008 | Yan | G06F 9/44521 |
| | | | 717/168 |
| 7,814,481 B1 | 10/2010 | Welder et al. | |
| 8,356,296 B1 | 1/2013 | Welder et al. | |
| 8,578,007 B1 | 11/2013 | Yellai et al. | |

(Continued)

FOREIGN PATENT DOCUMENTS

WO     WO 2015/078294 A1 *  6/2015  ............. G06F 9/445

OTHER PUBLICATIONS

Zhen et al., "Is It Possible to Automatically Port Kernel Modules ?", ACM, Aug. 2018, pp. 1-8; <https://dl.acm.org/citation.cfm?id=3265732>.*

(Continued)

*Primary Examiner* — S. Sough
*Assistant Examiner* — Ben C Wang
(74) *Attorney, Agent, or Firm* — Cindy Kaplan

(57) ABSTRACT

In one embodiment, a method includes creating an active container and a standby container for a single supervisor of an operating system at a network device, instantiating instances for active Kernel Loadable Modules (KLMs) for servicing the active container, instantiating instances for standby KLMs for servicing the standby container, wherein one or more of the standby KLMs comprise upgraded versions of the active KLMs, and switching over from the active container to the standby container to perform an in-service upgrade of the KLMs for the operating system. An apparatus and logic are also disclosed herein.

17 Claims, 4 Drawing Sheets

(56) References Cited

U.S. PATENT DOCUMENTS

| | | | |
|---|---|---|---|
| 8,782,632 B1* | 7/2014 | Chigurapati | G06F 8/65 717/168 |
| 9,170,834 B2* | 10/2015 | Beda | G06F 9/45558 |
| 9,338,055 B2* | 5/2016 | Choorakkot Edakkunni | H04L 41/082 |
| 9,430,223 B2* | 8/2016 | Filali-Adib | G06F 8/67 |
| 9,558,011 B2* | 1/2017 | Even | G06F 9/4406 |
| 9,830,143 B2* | 11/2017 | Chigurapati | G06F 8/65 |
| 9,841,988 B1* | 12/2017 | Magnezi | G06F 9/45558 |
| 2012/0072893 A1* | 3/2012 | Gupta | G06F 8/65 717/168 |
| 2012/0072894 A1* | 3/2012 | Wang | G06F 8/65 717/168 |
| 2012/0174095 A1* | 7/2012 | Natchadalingam | G06F 8/65 718/1 |
| 2012/0210311 A1* | 8/2012 | Kikuchi | G06F 8/65 717/168 |
| 2013/0326505 A1* | 12/2013 | Shah | G06F 9/455 718/1 |
| 2014/0101652 A1* | 4/2014 | Kamble | G06F 9/45558 717/171 |
| 2014/0105068 A1* | 4/2014 | Xu | H04L 67/34 370/255 |
| 2014/0123136 A1* | 5/2014 | Beda, III | G06F 9/45558 718/1 |
| 2014/0269254 A1* | 9/2014 | Choorakkot Edakkunni | H04L 41/082 370/218 |
| 2014/0281463 A1* | 9/2014 | Even | G06F 9/4406 713/2 |
| 2015/0103644 A1 | 4/2015 | Bharadwaj et al. | |
| 2015/0149658 A1* | 5/2015 | Wei | G06F 8/67 709/242 |
| 2015/0347170 A1* | 12/2015 | Mohammed | G06F 8/65 718/1 |
| 2016/0092202 A1* | 3/2016 | Filali-Adib | G06F 8/67 717/168 |
| 2016/0364231 A1* | 12/2016 | Tati | G06F 8/656 |
| 2017/0322793 A1* | 11/2017 | Ran | G06F 8/65 |
| 2018/0011871 A1* | 1/2018 | Kroll | G06F 17/30156 |
| 2018/0052678 A1* | 2/2018 | Chigurapati | G06F 8/65 |
| 2018/0067736 A1* | 3/2018 | De Zaeytijd | G06F 8/65 |
| 2018/0225138 A1* | 8/2018 | Scheessele | G06F 15/16 |

OTHER PUBLICATIONS

Jeong et al., "Functional Level Hot-patching Platform for Executable and Linkable Format Binaries", IEEE, Oct. 2017, pp. 489-494; <https://ieeexplore.ieee.org/stamp/stamp.jsp?tp=&arnumber=8122653>.*

Yikang Liu, "High Availability of Network Service on Docker Container", Atlantis Press, Nov. 2016, ICMIA 2016, pp. 505-508; <https://download.atlantis-press.com/proceedings/icmia-16/25864336>.*

* cited by examiner

IN-SERVICE UPGRADE OF KERNEL LOADABLE MODULES

TECHNICAL FIELD

The present disclosure relates generally to communication networks, and more particularly, to in-service upgrade of software in network devices.

BACKGROUND

Software upgrades that are used to implement specific features or services provided by a network device are often needed to capture new features, enhancements, or fixes to programming errors. For example, software upgrades may be implemented when customers want new or additional features or when solutions to specific programming errors require an upgrade to software. However, a significant impact on the availability of a network device may occur when upgrading software. As a result, downtime of a particular network device may impact the capability of an associated network.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
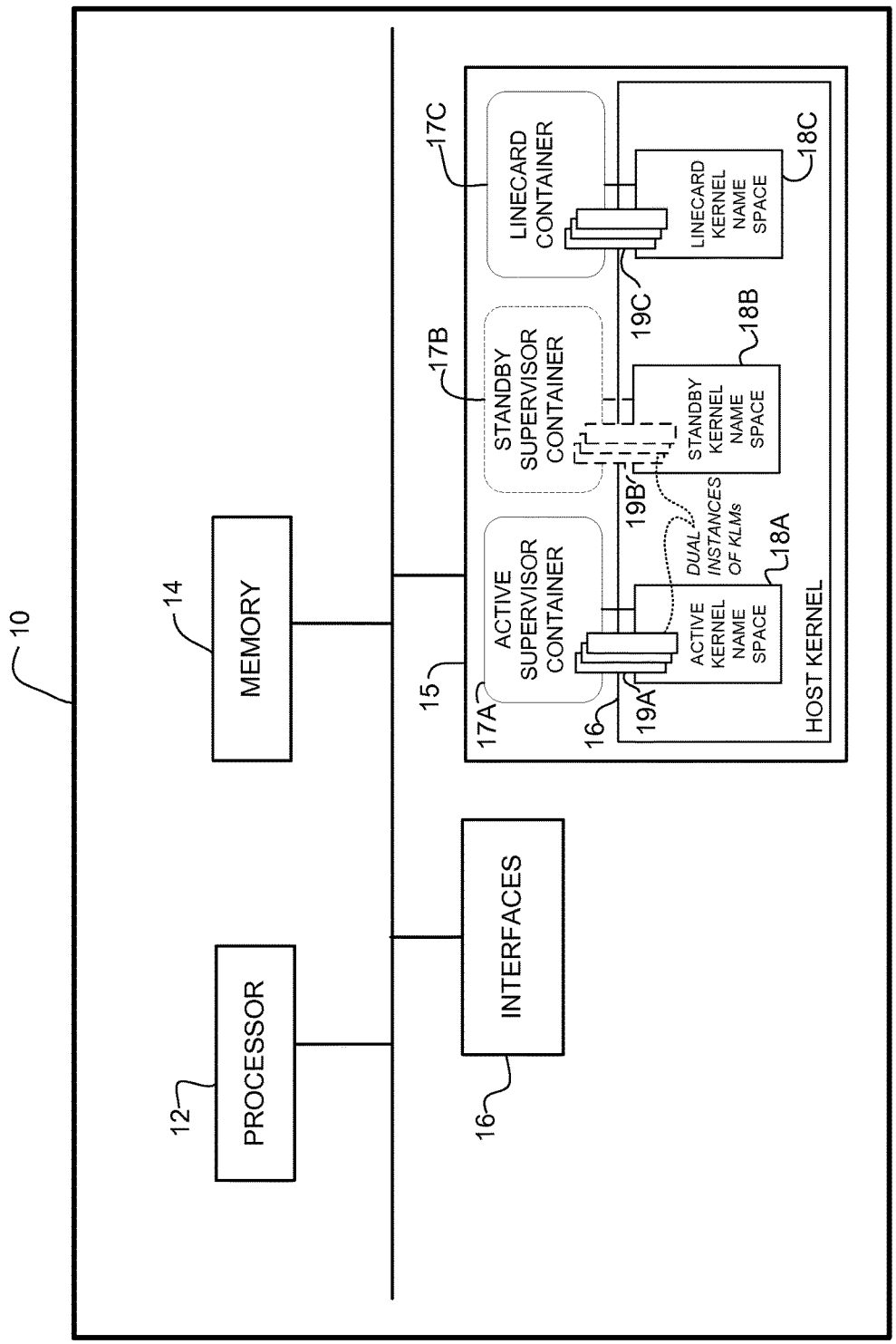
FIG. 1 depicts an example of a computer system in which embodiments described herein may be implemented.

In one embodiment, a method generally comprises creating an active container and a standby container for a single supervisor of an operating system at a network device, instantiating instances for active Kernel Loadable Modules (KLMs) for servicing the active container, instantiating instances for standby KLMs for servicing the standby container, wherein one or more of the standby KLMs comprise upgraded versions of the active KLMs, and switching over from the active container to the standby container to perform an in-service upgrade of the KLMs for the operating system.

In yet another embodiment, an apparatus generally comprises a host operating system comprising an active kernel name space associated with an active container and a standby kernel name space associated with a standby container, the active and standby containers defining a single supervisor for the host operating system, and a processor operable to instantiate instances for active Kernel Loadable Modules (KLMs) for servicing the active container, instantiate instances for standby KLMs for servicing the standby container, wherein one or more of the standby KLMs comprise upgraded versions of the active KLMs, and switch over from the active container to the standby container to perform an in-service upgrade of the active KLMs for the host operating system.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

As network devices function within a communications network, there may be a need to upgrade software. In most networks, a significant portion of downtime is due to software upgrade or maintenance. For example, software upgrades to implement new features or capabilities, or apply maintenance are often primary causes for system inaccessibility. Performing an In-Service Software Upgrade (ISSU) as opposed to a device reload significantly reduces the impact and downtime by upgrading software while the network device remains in service in the network.

In one example, ISSU on network devices (e.g., routers, switches, or other network elements) may be performed using redundant router processor/supervisor physical cards on a modular chassis. For example, a route processor (RP1) may be active in slot-X, while RP2 is in standby mode on slot-Y. In this example, during in-service software upgrade, the route processor physical card (RP2) in the role of standby is first upgraded with new software. The switch over is then triggered for the current standby card (RP2) with the new software to become active. The route processor physical card (RP1) may then be upgraded with the new software and come up in the role of standby. There may be a physical Ethernet connection between RP1 and RP2 for use by software running on the two physical cards to communicate with each other for any syncing purposes.

Many companies that use a base operating system such as Linux use Kernel Loadable Modules (KLMs) to provide performance and other benefits of KLMs, while at the same time not violating GPLs (General Public Licenses) and protecting their intellectual property. KLMs (also referred to as loadable kernel modules, kernel extensions, kernel modules, or kernel-mode drivers) are pieces of code that are loaded into the kernel, as opposed to being a separate user process.

With advancements in software developments in the field of Linux containers, there is a need for in-service software upgrade with dual Linux containers operating in active or standby roles on a single physical card. While the containers provide containment of user processes, with the kernel being the same for both the Linux containers, a mechanism is needed to contain the KLMs as well as to be able to upgrade the KLMs.

The embodiments described herein provide for the upgrade of KLMs to realize container based in-service software upgrades. In certain embodiments, dual instances of each upgradable KLM are used, with each instance servicing a container. Containment may be achieved by having dual instances of each KLM such that an instance of a KLM is servicing only one container at any given time. In one embodiment, the dual instances of KLMs are created by auto-generating code to prevent symbol clashes when installing the kernel module. As described in detail below, the embodiments facilitate in-service software upgrades on single supervisor based network devices and improve the capabilities and reliability of single supervisor based network devices. The embodiments allow for the upgrade of software for new functionality while the network device is still in service with little or no disruption to data traffic. One or more embodiments may allow for a reduced control plane down time with a single physical supervisor model, similar to the control plane down time with a dual physical supervisor model.

Referring now to the drawings and first to FIG. 1, an example of a network device 10 that is capable of in-service upgrade of KLMs is shown. The network device 10 may comprise, for example, a router, switch (e.g., ToR (Top of Rack) switch), server, hub, firewall, gateway, router/switch, workstation, mainframe, appliance, host, and the like. The network device 10 may operate in a network comprising any number of network devices in communication via any number of nodes (e.g., routers, switches, controllers, gateways, access layer devices, aggregation layer devices, edge devices, core devices, or other network devices), which facilitate passage of data within the network. The network device 10 may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

In one embodiment, the network device 10 is a programmable machine that may be implemented in hardware, software, or any combination thereof. The network device 10 includes one or more processor 12, memory 14, network interfaces 16, and host OS (Operating System) 15.

Memory 14 may be a volatile memory or non-volatile storage, which stores various applications, operating systems, modules, and data for execution and use by the processor 12. For example, components of the host operating system 15 (e.g., code, logic, software, firmware, etc.) may be stored in memory 14.

Logic may be encoded in one or more tangible media for execution by the processor 12. For example, the processor 12 may execute codes stored in a computer-readable medium such as memory 14. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 16 may comprise any number of interfaces (linecards, ports) for receiving data or transmitting data to other devices. The network interface 16 may include, for example, an Ethernet interface for connection to a computer or network. The network interfaces 16 may be configured to transmit or receive data using a variety of different communication protocols. The interfaces 16 may include mechanical, electrical, and signaling circuitry for communicating data over physical links coupled to the network.

In the example shown in FIG. 1, the host operating system 15 includes a host kernel 16 in communication with a supervisor comprising an active container 17A and standby container 17B, and a linecard comprising linecard container 17C. The containers (software containers) 17A, 17B, 17C effectively partition the resources managed by a single operating system into isolated groups to better balance conflicting demands on resource usage between the isolated groups. In one example, the containers 17A, 17B, 17C are Linux containers (LXCs), which are part of an operating system-level virtualization environment for running multiple isolated Linux systems (containers) on a single Linux control host 16.

Each software container 17A, 17B, 17C comprises a plurality of KLMs 19A, 19B, 19C having an associated name space 18A, 18B, 18C in the host kernel 16. As described in detail below, dual instances of KLMs 19A, 19B are created with stateful handoff between the active and standby containers 17A, 17B. Containment is achieved by having dual instances of each KLM such that an instance of a KLM is servicing only one container at a given time. The embodiments allow the KLMs 19A, 19B to run as multiple instances and share the hardware devices between the virtual instances so that multiple instances of KLMs can be loaded in the same kernel 16. In one or more embodiments, the dual instances of KLMs 19A, 19B are created by auto-generating code such that there will be no symbol clashes when installing the kernel module, as described in detail below.

Each active and standby supervisor container 17A, 17B may include, for example, a system manager linked to one or more services, an installer, CLI (Command Line Interface), object store, persistent storage service (pss), or any other components that may be used to implement the embodiments described herein. The linecard container 17C may also be provided with a system manager linked to one or more linecard services. As described below, the linecard container services may be restarted and LC KLMs 19C unloaded and loaded after switchover from active to standby supervisor container.

The host may also include one or more host KLMs that are not upgradable. The host KLMs are associated with administrative services, which may include host based services, an install agent, and a container provisioning and management module, for example.

It is to be understood that the network device 10 shown in FIG. 1 and described above is only an example and that different configurations of network devices may be used. The network device 10 may further include any suitable combination of hardware, software, algorithms, processors, devices, components, modules, or elements operable to facilitate the capabilities described herein.

Figure 2:
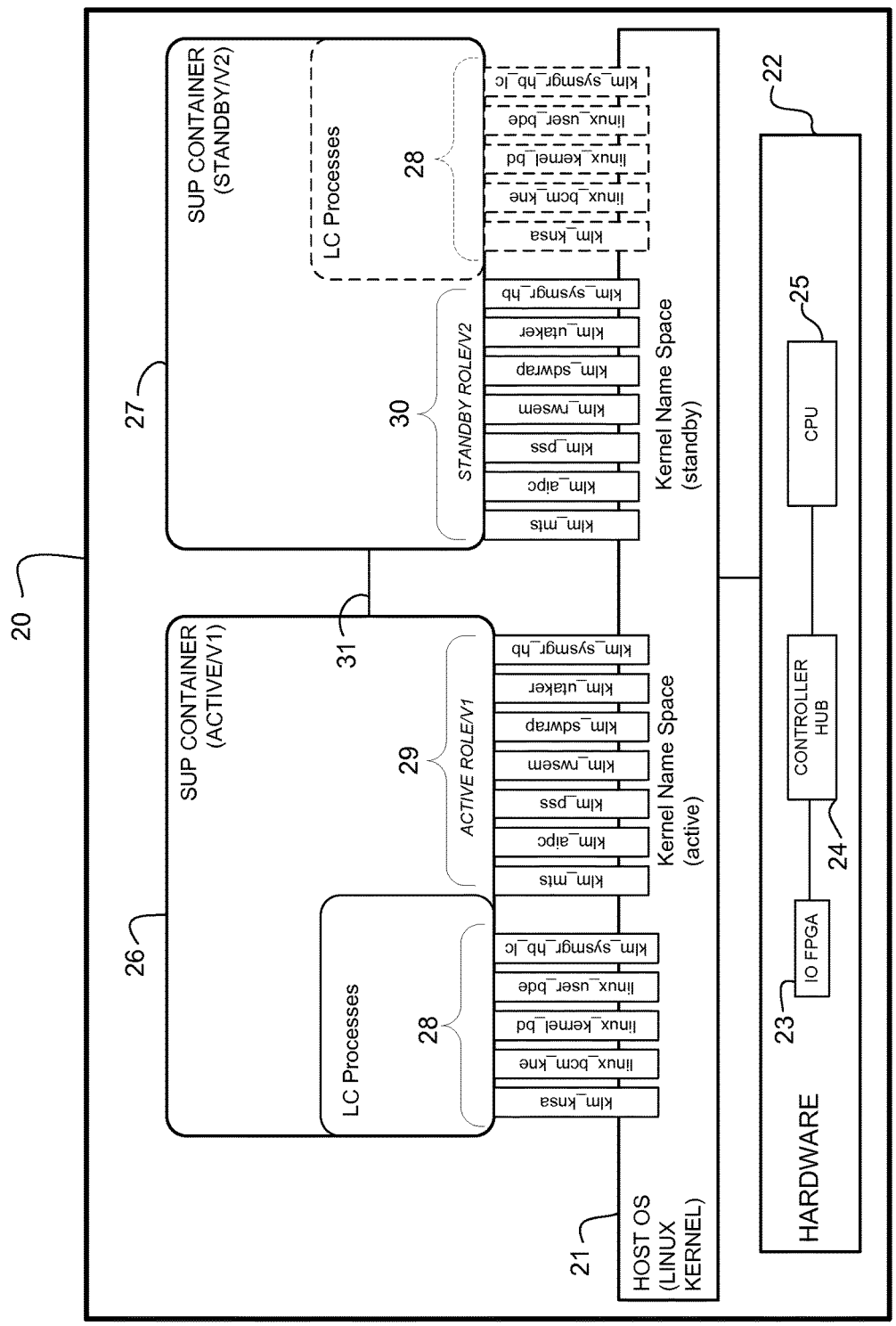
FIG. 2 illustrates an example of a system for in-service upgrade of kernel loadable modules, in accordance with one embodiment.

FIG. 2 illustrates an example of a computer system 20 operable to implement in-service upgrade of KLMs, in accordance with one embodiment. In this example, host OS (Operating System) 21 is a Linux distribution providing the virtualization tools and basic services needed to create LXC (Linux Containers) 26, 27 on the network device. The host OS 21 and containers 26, 27 operate as virtual nodes. For simplification only the host OS 21, supervisor containers 26, 27, and hardware 22 are shown. As described above with respect to FIG. 1, the system 20 may also include a linecard container or other components. For example, the system 20 may include a collection of processes (administration services) running the host OS natively, which help manage the LXCs and orchestrate a SSO (Stateful Switchover) based upgrade.

Hardware 22 may include IO (input/output) FPGA (Field-Programmable Gate Array) 23, controller hub 24, CPU (Central Processing Unit) 25, or any combination of these or other components. For example, hardware 22 may comprise one or more ASICs (Application-Specific Integrated Circuits).

The system software may run directly on the hardware 22 and inside a separate LXC for the supervisor (active container 26 or standby container 27) and linecard. As described further below, the standby supervisor container 27 is spawned as part of the KLM upgrade procedure and brought up as a standby supervisor.

The supervisor containers 26, 27 may communicate with each other over an emulated physical connection 31 using a virtual Ethernet link (or virtual Ethernet (veth) pair). The standby container 27 may communicate with the active container 26 over MTS (Message and Transaction Service) for version checking, syncing, etc. The containers 26, 27 may also communicate via a management interface at the host OS 21. In one example, an active sysmgr and standby sysmgr may communicate via MTS/AIPC.

As previously described with respect to FIG. 1, dual instances of KLMs are created at the supervisor containers. As shown in FIG. 2, a first plurality of active KLMs 29 are instantiated at active container 26 in an active role and a second group of standby KLMs 30 are instantiated at the standby container 27 in a standby role. In the example shown in FIG. 2, these include klm_mts (message and transaction service), klm_pss (persistent storage service), klm_sysmgr_hb (system manager), klm_aipc, klm_rwsem, klm_sdwrap, and klm_utaker. The KLMs 29 are associated with an active kernel name space on the host OS (Linux kernel) 21 and the KLMs 30 are associated with a standby kernel name space on the host OS. One or more instances of the standby KLMs 30 may be upgraded versions of the corresponding instances of the active KLMs 29. As noted above, the KLMs 29, 30 service only one container at a time. Thus, even though there are dual instances of a KLM, only one instance is active at one time.

Modules 28 associated with LC processes (e.g., klm_knsa, linux_bcm_kne, linux_kernel_bd, linux_user_bde, and klm_sysmgr_hb_lc) are associated to only one container at a time.

The addition of a linecard container (as shown in FIG. 1) provides for cleaner isolation for LC applications. However, the linecard container itself is not virtualized as active/standby because the linecard applications and install infrastructure were not designed to work in active/standby mode. Also, a four container model would require more memory/CPU resources. In one embodiment, a rolling upgrade model is utilized across the supervisor and linecard. In this model, the supervisor is upgraded first (as described below) and the LCs upgraded either one at a time or as a batch of LCs. During the upgrade window, the supervisor would be running a different version of software (code) than the LC.

In order to employ a rolling upgrade, KLMs such as klm_mts (message and transaction service), klm_pss (persistent storage service), klm_sysmgr_hb (system manager), and the like, will be instantiated separately for the linecard container. The LC container may also need to instantiate its own klm_sse_lc module to get any of the hardware/platform information serviced from the single hardware/platform KLM modules. These KLMs may be initialized in the host OS 21. In one example, an installer may orchestrate the supervisor control plane upgrade using a hot standby/SSO (Stateful Switchover) mechanism. The linecard application would still run older versions during the supervisor control plane upgrade. The installer may perform a hitless upgrade with the help of a linecard manager, which will orchestrate the LC upgrade sequence. The LC container may then go through a stateful reboot with the newer software.

An overview of the KLM in-service upgrade process is described below with respect to the flowchart of FIG. 3 and sequence diagram of FIG. 4.

It is to be understood that the components and architecture shown in FIG. 2 are only examples and that other components or architectures may be used, without departing from the scope of the embodiments.

Figure 3:
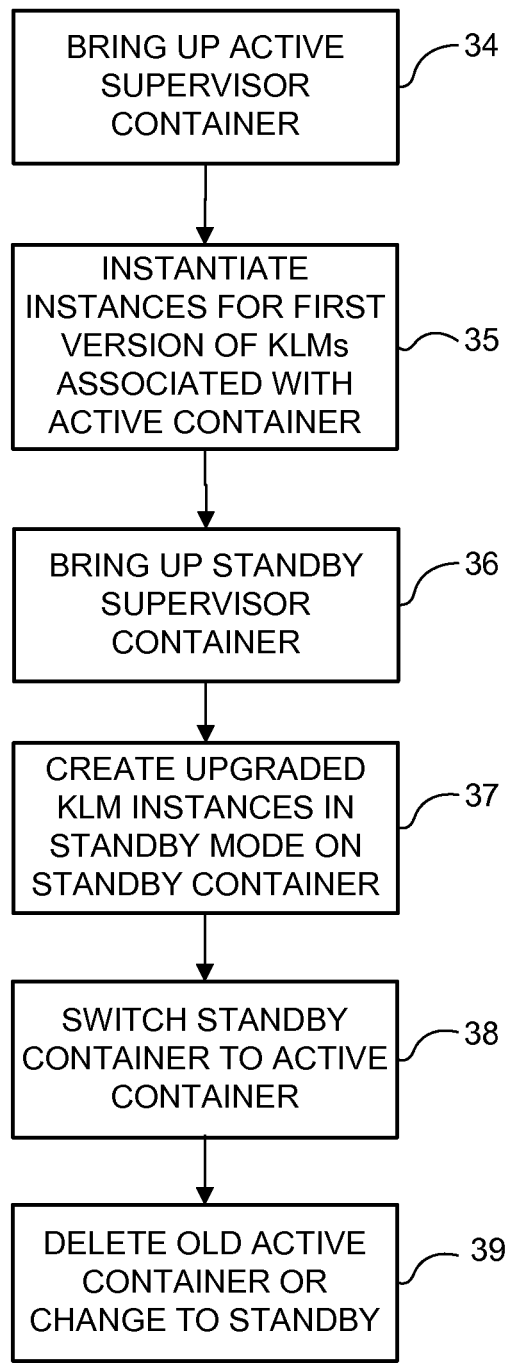
FIG. 3 is a flowchart illustrating an overview of a process for in-service upgrade of kernel loadable modules, in accordance with one embodiment.

FIG. 3 is a flowchart illustrating an overview of a process for in-service KLM upgrade, in accordance with one embodiment. At step 34, the system brings up (creates) the active supervisor software container 26 for a single supervisor of an operating system at a network device (FIGS. 2 and 3). Instances for KLMs 29 servicing the active supervisor container 27 are instantiated (step 35). The standby container 27 is then brought up (created) (step 36). An in-service software upgrade can then be performed by instantiating KLM instances 30 for servicing the standby container 27 (step 37). These KLMs 30 are in standby mode along with the container 27. One or more of the standby KLMs (instances of KLMs at standby container) comprise upgraded versions of the active KLMs. The standby container 27 communicates with the active container 26 to get the current running state of the active container. The standby container 27 is then switched to active and the upgraded KLMs 30 are now operational (step 38). The previous active container 26 can then be deleted or changed to the new standby container (step 39). By switching over from the active container 26 to the standby container 27, an in-service upgrade of the active KLMs can be performed for the operating system 21.

The linecard may still be running an older software version during the supervisor control plane upgrade. After upgrade of the supervisor, the linecard container can go through a stateful reboot with the upgraded software. The supervisor control plane may send and receive protocol packets during the LC upgrade window.

It is to be understood that the process shown in FIG. 3 and described above is only an example and steps may be added, modified, reordered, or combined, without departing from the scope of the embodiments. Also, it may be noted that the processor 12 or host OS 15 shown in FIG. 1 (or a combination thereof) may implement one or more of the steps shown in FIG. 3 and described herein. For example, logic encoded on computer readable media and executed by the processor 12 may be operable to perform one or more steps shown in FIG. 3 and described above.

Figure 4:
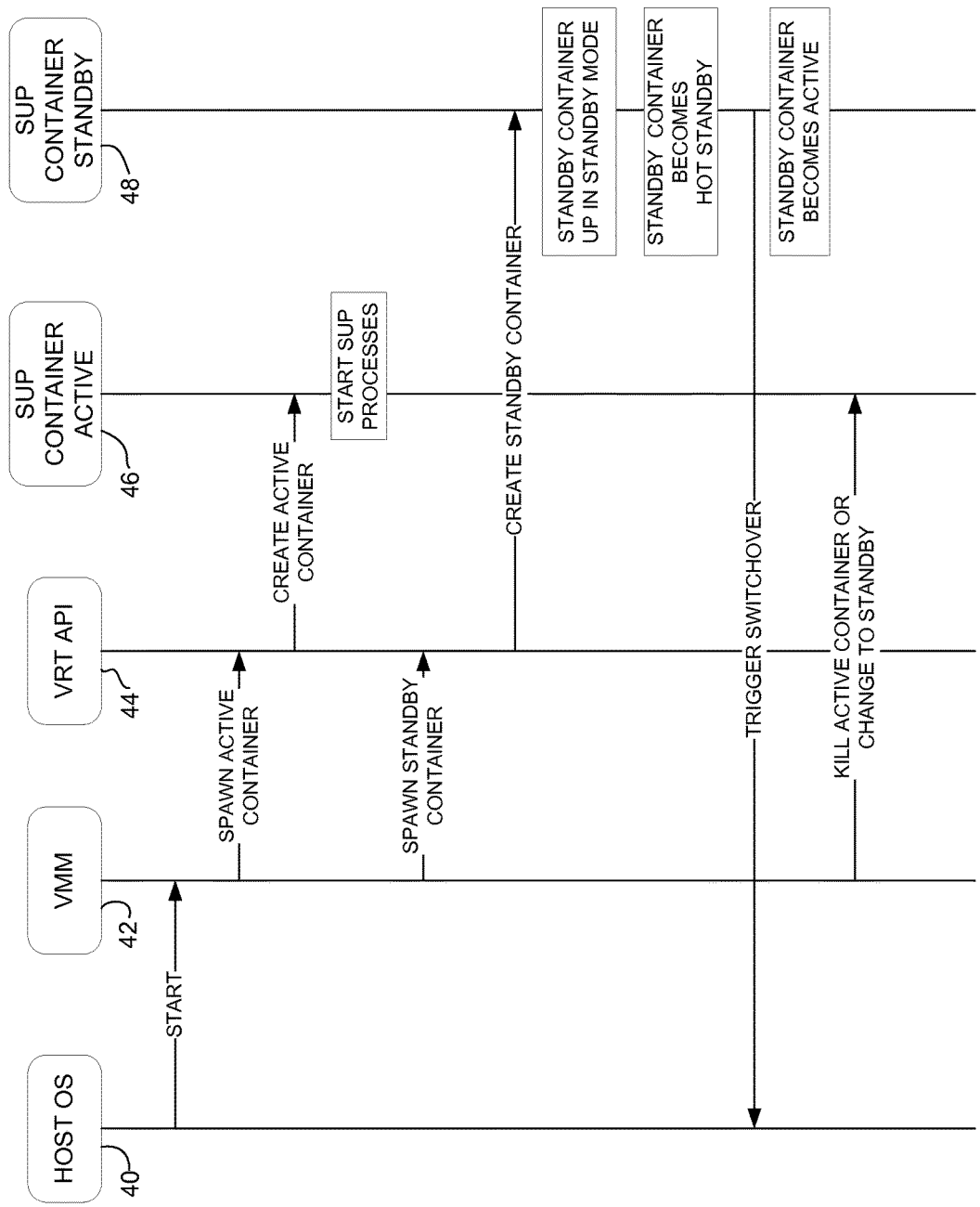
FIG. 4 is a sequence diagram for in-service upgrade of kernel loadable modules, in accordance with one embodiment.

FIG. 4 is a sequence diagram illustrating an example of a process flow between a host OS 40, VMM (Virtual Machine Manager/Monitor (e.g., Hypervisor)) 42, VRT API (Virtualization Application Programming Interface) 44, active supervisor container 46, and standby supervisor container 48. Once the kernel boots up, it can run init scripts that are related to host OS bring up. Host OS bring up triggers bring up of the main host service VMM 42. As described below, the VMM boot code brings up the primary LXC for active supervisor 46, and once the primary supervisor is up, the VMM boot code can bring up bring the LC container (not shown) and standby container 48.

As shown in FIG. 4, the host OS 40 initiates the process with VMM 42. The VMM 42 may interact with code block (not shown) to setup a directory hierarchy and perform other activities (e.g., set up groups, rules, etc.). The VMM 42 may, for example, setup a file system for the primary supervisor instance, unpack system software and local system KLMs from a system image, run host initialization for the container, including installing the KLMs, and boot up the primary container for the supervisor. The local system KLM/init scripts may be organized as a separate package, with these KLMs installed in the host before spawning of the supervisor container. After the VMM 42 spawns the active container 46, the container is created by the VRT API 44.

The KLMs are installed and a container template may be dynamically generated so that device numbers are exposed to the container.

The VMM 42 sets up the container for LC applications by first setting up a file system for the LC instance. The VMM 42 may then unpack LC KLMs (e.g., MTS, PSS, sysmgr_hb, klm_sse_lc, BCM) from the system image and install the LC KLMs and bootup the LC container.

The VMM 42 then works with the VRT API 44 to spawn and create the backup container 48. When it is time to upgrade one or more of the KLMs, the VMM 42 receives a request to bring up the standby container 48 with a newer image (one or more upgraded KLMs). The standby container 48 then becomes a hot standby and triggers the switchover sequence in which the standby supervisor container becomes the active supervisor container. After the standby container 48 is switched to the active container, the old KLMs can be uninstalled. The previously active container 46 may be killed or changed to a standby container.

The installer may then request the LCM (Linecard Manager) to perform an upgrade sequence. In one example, the LCM invokes the host API to restart the LC LXC with a newer software version. The LCM may then trigger an LC_upgrade_over handshake to the supervisor after successful restart of the LC applications.

As previously described with respect to FIG. 2, dual instances of KLMs 29, 30 are used (one set per LXC instance 26, 27), which are loaded with the context of active and standby LXCs. This results in sharing of the hardware devices between the virtual instances and the need to load multiple instances of KLMs in the same kernel. Linux kernel module loader subsystems do not allow the same KLM to be loaded twice as the module name and exported functions would conflict with the already loaded instance. In one embodiment, a solution to this conflict is to prefix the module name and exported functions with a prefix identifier (VM identifier) so that the namespace can be introduced in the module build time. For example, the modules that are packaged as part of "nxos_system_klms.rpm" may be packaged as shown in the following example:

```
/isan/lib/modules/0/klm_mts_0.ko
/isan/lib/modules/0/klm_sse_0.ko
/isan/lib/modules/0/klm_nvram_0.ko
/isan/lib/modules/1/klm_mts_1.ko
/isan/lib/modules/1/klm_sse_1.ko
/isan/lib/modules/1/klm_nvram_1.ko
```

Similarly, the LC KLMs may be packaged with LC prefix:

```
/lc/isan/lib/modules/klm_mts_lc.ko
/lc/isan/lib/modules/klm_aipc_lc.ko
/lc/isan/lib/modules/klm_pss_lc.ko
```

However, some of the LC KLMs (klm_sysmgr-hb_lc.ko/klm_sse_lc.ko) do not need to be prefixed and may be used as is from the original source:

```
/lc/isan/lib/modules/klm_sysmgr-hb_lc.ko
/lc/isan/lib/modules/klm_sse_lc.ko
```

A new code generator tool may be used to re-generate source files with module name and exported symbols prefixed with "_0" and "_1". The build tools may be used to generate two KLM module object codes for each of the KLM to be virtualized.

It is to be understood that the prefixes, module names, and KLMs described above are only examples and that different formats may be used to distinguish between instances of active and standby KLMs, or different types of KLMs may be used without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   creating an active container and a standby container for a single supervisor of an operating system at a network device;
   instantiating instances for active Kernel Loadable Modules (KLMs) for servicing said active container;
   instantiating instances for standby KLMs for servicing said standby container, wherein one or more of said standby KLMs comprise upgraded versions of said active KLMs;
   automatically generating a prefix identifier inserted into active and standby KLM names to prevent symbol clashes between said active KLMs and said standby KLMs; and
   switching over from said active container to said standby container to perform an in-service upgrade of said active KLMs for the operating system at the network device.

2. The method of claim 1 wherein the operating system comprises an active kernel name space associated with said active KLMs and a standby kernel name space associated with said standby KLMs.

3. The method of claim 1 wherein said prefix identifier is inserted into said active and standby KLM names to distinguish between said active KLMs and said standby KLMs.

4. The method of claim 1 wherein said standby container communicates with said active container over a virtual Ethernet link to obtain current running state of said active container.

5. The method of claim 1 further comprising changing said active container to a standby container after switching over from said active container to said standby container.

6. The method of claim 1 further comprising restarting a linecard container with a new version of linecard KLMs after switching to said standby container.

7. An apparatus comprising:
   a host operating system comprising an active kernel name space associated with an active container and a standby kernel name space associated with a standby container, said active and standby containers defining a single supervisor for the host operating system; and
   a processor operable to instantiate instances for active Kernel Loadable Modules (KLMs) for servicing said active container, instantiate instances for standby KLMs for servicing said standby container, wherein one or more of said standby KLMs comprise upgraded versions of said active KLMs, automatically generate a prefix identifier inserted into active and standby KLM names to prevent symbol clashes between said active KLMs and said standby KLMs, and switch over from said active container to said standby container to perform an in-service upgrade of said active KLMs for the host operating system.

8. The apparatus of claim 7 wherein the processor inserts said prefix identifier into said active and standby KLM names to distinguish between said active KLMs and said standby KLMs.

9. The apparatus of claim 7 wherein said standby container communicates with said active container over a virtual Ethernet link to obtain current running state of said active container.

10. The apparatus of claim 7 wherein said active container is changed to a standby container after switching over from said active container to said standby container.

11. The apparatus of claim 7 further comprising memory for storing two KLM code versions, one for said active KLMs and one for said standby KLMs.

12. Logic encoded on one or more non-transitory computer readable media for execution and when executed operable to:
　create an active container and a standby container for a single supervisor of an operating system at a network device;
　instantiate instances for active Kernel Loadable Modules (KLMs) for servicing said active container;
　instantiate instances for standby KLMs for servicing said standby container, wherein one or more of said standby KLMs comprise upgraded versions of said active KLMs;
　automatically generate a prefix identifier inserted into active and standby KLM names to prevent symbol clashes between said active KLMs and said standby KLMs; and
　switchover from said active container to said standby container to perform an in-service upgrade of said active KLMs for the operating system.

13. The logic of claim 12 wherein the operating system comprises an active kernel name space associated with said active KLMs and a standby kernel name space associated with said standby KLMs.

14. The logic of claim 12 wherein said prefix identifier is inserted into said active and standby KLM names to distinguish between said active KLMs and said standby KLMs.

15. The logic of claim 12 wherein said standby container communicates with said active container over a virtual Ethernet link to obtain current running state of said active container.

16. The logic of claim 12 when executed operable to change said active container to a standby container after switching over from said active container to said standby container.

17. The logic of claim 12 when executed operable to restart a linecard container with new version of linecard KLMs after switching to said standby container.

* * * * *